Patented Feb. 13, 1951

2,541,924

UNITED STATES PATENT OFFICE 2,541,924

SYNTHESIS OF SUBSTITUTED IMIDAZOLES

Reuben G. Jones, Indianapolis, Ind., assignor to Eli Lilly and Company, Indianapolis, Ind., a corporation of Indiana No Drawing. Application September 17, 1948, Serial No. 49,863

7 Claims. (Cl. 260—309)

My invention relates to the preparation of substituted imidazoles and more particularly to a process of preparing 2-mercapto-5-carboxyimidazole esters.

The imidazole nucleus is found in a number of biologically important substances, among which are compounds such as histamine, histadine, alantoin and pilocarpine. All of these compounds are characterized by the presence of substituents in the 5-position of the imidazole nucleus. Methods for the preparation of 5-substituted imidazoles are known. However, the general methods hitherto known to the art involve many tedious steps and are productive of low yields of imidazoles.

It is an object of my invention to provide a simple and convenient method of synthesizing 2-mercapto-5-carboxyimidazole esters which are useful as intermediates in the synthesis of imidazoles having substituents in the 5-position. Other objects will be apparent from the following disclosure.

In fulfillment of the above and other objects, I have provided a synthesis of 2-mercapto-5-carboxyimidazole esters, which comprises condensing a C-formylglycine ester with a thiocyanate.

The reaction between the C-formylglycine ester enol and the thiocyanate leading to the production of the 2-mercapto-5-carboxyimidazole esters may be represented by the following equation:

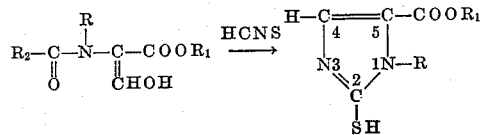

wherein R represents hydrogen or an alkyl, cycloalkyl, aryl, or alphyl radical, $R_1$ represents a lower aliphatic esterifying radical, and $R_2$ represents hydrogen, or a methyl or ethyl radical.

From the above equation it will be seen that my invention contemplates the preparation of 2-mercapto-5-carboxyimidazole esters which are substituted in the 5-position by an esterified carboxylic acid group such as a carbomethoxy, carbethoxy, or a carbobutoxy group or the like, and which may be unsubstituted in the 1-position, or substituted by a group such as a methyl, hexyl, propyl, cyclohexyl, cyclopentenyl, phenyl, benzyl or phenethyl group.

In the practice of my invention, one method of procedure comprises mixing in aqueous solution approximately equivalent molecular quantities of the C-formylglycine ester enol with hydrogen thiocyanate, i. e., thiocyanic acid. An equivalent procedure employs water-soluble metal salts of one or both of the reactants, and the carrying out of the reaction in the presence of a strong, non-oxidizing mineral acid, the acid being necessary for the formation of the acidic form of the reactants, which form is required for the reaction to proceed. Thus for example, a water-alcohol solution of approximately equivalent molecular amounts of the sodium salt of a C-formylglycine ester enolate and sodium thiocyanate can be treated with about 2 mols of hydrochloric acid whereupon the reaction proceeds and the 2-mercapto-5-substituted imidazole is formed.

The intermediates used in my novel synthesis can be obtained by methods known to the art. Thiocyanic acid and its water-soluble salts are, of course, well known. The C-formylglycine ester enols are known as a class of compounds and can be synthesized in several ways. For the purposes of illustration, a method of synthesis of C-formylglycine ester enols which may be represented by the following formula

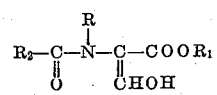

wherein R, $R_1$ and $R_2$ have the same significance as before, is outlined below: An inorganic acid salt of a primary amine containing the desired R substituent is treated in aqueous solution with formaldehyde and potassium cyanide to produce an aminoacetonitrile wherein the amino group bears the R substituent. The substituted aminoacetonitrile is hydrolyzed to the corresponding carboxylic acid and the acid is esterified in the presence of a lower, aliphatic alcohol such as is commonly employed for esterifying purposes, producing a glycine ester wherein the ester, or $R_1$, radical is a lower aliphatic radical and the amino group of the glycine portion of the molecule bears an R substituent. The glycine ester is acylated to give an N-acyl-N-R-substituted glycine ester having a formyl, acetyl or propionyl radical as the acyl group. The acylated ester is C-formylated with methyl formate and alkali in benzene according to the method of Claisen [Ann. 337, 236 (1904)], yielding an alkali metal enolate salt of a C-formylglycine ester. The metal enolate salt of the glycine ester can be isolated by adding several volumes of ether to the benzene solution and filtering off the solid enolate salt. The salt, so prepared, can be preserved for some time before employing it in my synthesis. If desired, the enolate salt need not be isolated but may be extracted with water from the benzene solution in which it is prepared, and the aqueous solution employed in my reaction. The free enol can be prepared from the salt by acidifying an aqueous solution of the salt and extracting the enol from the aqueous solution with a water-immiscible solvent such as chloroform.

The reactions involved in the above-described preparation of the C-formyl glycine ester enols may be represented by the following equations in which R, $R_1$ and $R_2$ have the same significance as heretofore and M represents a metal which forms a water-soluble salt with the glycine ester enol.

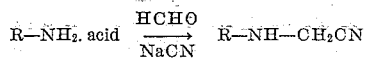

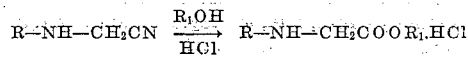

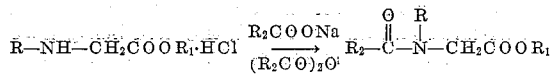

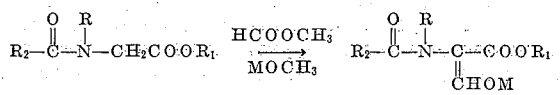

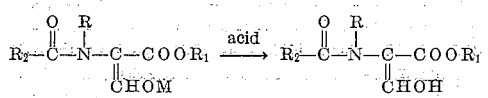

The conditions under which the C-formylglycine ester enol is condensed with the thiocyanate are not critical. A solvent is employed, and preferably the solvent is an aqueous solvent such as water or aqueous alcohol which contains a sufficient amount of water to retain in solution any inorganic salt which may be produced in the reaction, as for example when one or both of the principal reactants is in the form of a water-soluble metal salt. The presence of a relatively large proportion of water in the aqueous solvent is also of assistance in the isolation of the 2-mercapto-5-carboxyimidazole ester which has a relatively low solubility in water.

Preferably the condensation is carried out at a temperature above room temperature (i. e. 20° C.) in order to expedite the rate at which the reaction proceeds. Temperatures between about 60° C. and 100° C. are most desirable, but the condensation may be carried out satisfactorily despite substantial departures from this temperature range.

As noted above, when a water-soluble salt of one or both of the principal reactants is employed, a strong acid is used to produce the acid form of the reactants. The acid used may be of any strong, non-oxidizing mineral acid such as hydrochloric, hydrobromic, phosphoric acid and the like.

The following examples further illustrate my invention.

EXAMPLE 1

*Preparation of 1-isopropyl-2-mercapto-5-carbomethoxyimidazole*

1-isopropyl-2-mercapto-5-carbomethoxyimidazole represented by the formula

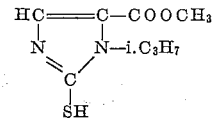

may be prepared in the following manner:

The enolate of N-formyl-N-isopropyl-C-formylglycine methyl ester used in preparing 1-isopropyl-2-mercapto-5-carbomethoxyimidazole is prepared as follows: 191 g. (2 mols) of isopropylamino hydrochloride and 250 cc. of 40 percent Formalin are dissolved in 100 cc. of water, and while the mixture is cooled in an ice bath and continuously stirred, there is added in portions over a period of about two hours, a cold concentrated aqueous solution of 130 g. (2 mols) of potassium cyanide. During this time the temperature is kept below 10° C. and the mixture is kept in a carbon dioxide atmosphere, by adding Dry Ice to the solution from time to time. The mixture is stirred for one additional hour and is then extracted with two 500 cc. portions of ether. The combined ether extracts are dried over calcium oxide and the ether removed by evaporation in vacuo. The residue, comprising isopropylaminoacetonitrile, is dissolved in 2.5 liters of dry methanol saturated in the cold with hydrogen chloride. The resulting solution is allowed to stand at room temperature for about 10 hours and is then heated under reflux for four hours. The ammonium chloride which separates is filtered off and the filtrate is evaporated in vacuo to obtain crude N-isoproplyglycine methyl ester hydrochloride. The crude ester hydrochloride is dissolved in 250 cc. of 98 percent formic acid. To this solution is added a hot solution of 150 g. of sodium formate in 200 cc. of 98 percent formic acid. After the mixture has stood for about an hour, the precipitated sodium chloride is filtered off and 450 cc. of acetic anhydride are added to the filtrate in portions. After the vigorous reaction has subsided the mixture is heated for about 30 minutes on a steam bath to complete the reaction. The formic and acetic acids present in the reaction mixture are removed by evaporation in vacuo and the residue, comprising the acylated ester, is treated with one liter of acetone whereupon a further quantity of sodium chloride separates. The sodium chloride is filtered off, the acetone is removed from the filtrate by evaporation in vacuo and the residue is fractionally distilled in vacuo. N-formyl-N-isopropylglycine methyl ester boils at about 91–92° C. at 1.5 mm. pressure.

Analysis of the ester has shown the presence of 8.67 percent nitrogen as compared with the calculated 8.80 percent.

The sodium enolate salt of the N-formyl-N-isopropyl-C-formylglycine methyl ester is prepared by the Claisen method. A mixture of 106 g. (0.67 mol) of N - formyl - N - isopropylglycine methyl ester and 120 g. (2.0 mols) of dry methyl formate is cooled in an ice bath and a suspension of 40 g. (0.74 mol) of sodium methoxide in 150 cc. of anhydrous benzene is added in 5 portions, with continuous stirring, over a period of about one hour. The temperature of the reaction mixture is maintained below 15° C. and stirring is continued for about one hour after all of the sodium methoxide has been added. The reaction mixture is then allowed to stand in the refrigerator for about 24 hours. The sodium enolate salt is precipitated by the addition of 500 cc. of anhydrous ether. The precipitate is filtered off, washed with anhydrous ether and dried in vacuo.

140 g. (0.67 mol) of the sodium enolate salt of N-formyl-N-isopropyl-C-formylglycine methyl ester are dissolved in 500 cc. of water. While the solution is kept cold in an ice bath, 127 cc. (1.52 mol) of 12 N hydrochloric acid are added, and the solution is treated with 83.5 g. (1.03 mol) of sodium thiocyanate. The reaction mixture is removed from the cooling bath and heated for 45 minutes at about 90° C. The mixture is allowed to stand for a few hours at room temperature to aid crystallization of the 1-isopropyl-2-mercapto-5-carbomethoxyimidazole which is formed in the reaction. The mixture is then cooled to about 0° C., whereupon the 1-isopropyl-2-mercapto-5-carbomethoxyimidazole formed in the reaction is substantially completely precipitated. The crystalline precipitate is filtered off, washed with cold water and dried. About 125 g. (93 percent of the theoretical amount) of 1-isopropyl-2-mercapto-5-carbomethoxyimidazole are obtained.

1-isopropyl-2-mercapto-5-carbomethoxyimidazole thus prepared melted at 148–149° C. Analysis showed the presence of 13.61 percent nitrogen as compared with the calculated amount of 13.99 percent.

EXAMPLE 2

1-isopropyl-2-mercapto-5-carbomethoxyimidazole may also be prepared as follows:

The sodium salt of N-formyl-N-isopropyl-C-formylglycine ester prepared as described in Example 1 is converted to its acid form by dissolving the sodium enolate salt in a minimum amount of ice cold water, acidifying the solution with hydrochloric acid and repeatedly extracting the aqueous solution with chloroform. The combined chloroform extracts are dried over magnesium sulfate and the chloroform is removed by evaporation under reduced pressure leaving as a residue the N-formyl-N-isopropyl-C-formylglycine ester.

70 g. of N-formyl-N-isopropyl-C-formylglycine methyl ester are dissolved in 300 cc. of 30 percent aqueous ethanol and a concentrated aqueous solution containing 28 g. of thiocyanic acid is added with stirring. The mixture which originally is at room temperature is heated to about 80° C. for about one hour, and is then cooled to about 0° C. 1-isopropyl-2-mercapto-5-carbomethoxyimidazole separates in crystalline form. The crystalline precipitate is filtered off, is washed with a small amount of water and dried.

EXAMPLE 3

Preparation of 1-methyl-2-mercapto-5-carbomethoxyimidazole 1-methyl-2-mercapto-5-carbomethoxyimidazole represented by the formula

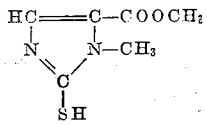

is prepared as follows:

A suspension of the sodium salt of N-formyl-N-methyl-C-formylglycine methyl ester in benzene is prepared according to the method set out in Example 1, except that methylamine is used instead of isopropylamine. The benzene suspension is extracted several times with 75 cc. portions of cold water to obtain the sodium enolate salt in aqueous solution. An aqueous extract thus obtained and which contains about 350 g. of N-formyl-N-methyl-C-formylglycine methyl ester is cooled to about 0° C. and treated with 450 cc. (5.4 mols) of 12 N hydrochloric acid. Immediately thereafter 226 g. (2.8 mols) of crystalline sodium thiocyanate are added and the mixture is removed from the cooling bath and heated for 45 minutes at 90° C. After standing a few hours at room temperature, the reaction mixture is cooled to about 0° C. to cause complete precipitation of the 1-methyl-2-mercapto-5-carbomethoxyimidazole from solution. The precipitate is filtered off. The yield of 1-methyl-2-mercapto-5-carbomethoxyimidazole is 300 g. (72 percent of theory).

1-methyl-2-mercapto-5-carbomethoxyimidazole thus prepared melted at 193–194° C. Analysis showed the presence of 16.43 percent nitrogen as compared with the calculated amount of 16.27 percent.

EXAMPLE 4

Preparation of 2-mercapto-5-carbethoxyimidazole 2-mercapto-5-carbethoxyimidazole represented by the formula

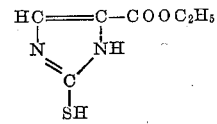

may be prepared as follows:

395 g. (3 mols) of N-formylglycine ethyl ester prepared from glycine ethyl ester by the general method set out in Example 1, and 670 g. (9 mols) of anhydrous ethyl formate are dissolved in 700 cc. of anhydrous benzene and cooled in an ice bath. A suspension of 220 g. (3.25 mols) of sodium ethylate in 500 cc. of anhydrous benzene is added, with stirring, in five portions over a period of one hour. The stirring is continued for another hour and the mixture is then placed in a refrigerator at 10° C. for about 48 hours. The cold mixture, which contains a suspension of the sodium salt of N-formyl-C-formylglycine ethyl ester, is extracted several times with cold water. The water extracts which contain the sodium enolate salt are combined and treated with 550 cc. (6.6 mols) of 12 N hydrochloric acid. 350 g. (3.6 mols) of potassium thiocyanate are added and the resulting mixture is heated for about 45 minutes at 80° C. The reaction mixture is allowed to stand at room temperature for a few hours and is then cooled in an ice bath, whereupon 2-mercapto-5-carbethoxyimidazole precipitates. The precipitate is filtered off and dried. The yield of 2-mercapto-5-carbethoxyimidazole melting at about 134° C. is about 280 g. (54 percent of theory).

Analysis of 2-mercapto-5-carbethoxyimidazole thus prepared showed the presence of 42.03 percent carbon and 4.99 percent hydrogen as compared with the calculated values of 41.84 percent carbon and 4.68 percent hydrogen.

EXAMPLE 5

*Preparation of 1-cyclohexyl-2-mercapto-5-carbomethoxyimidazole*

1 - cyclohexyl - 2 - mercapto - 5 - carbomethoxyimidazole represented by the formula

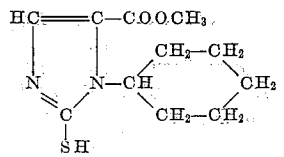

is prepared as follows:

186 g. (0.75 mol) of the sodium enolate salt of N - formyl - N - cyclohexyl - C - formylglycine methyl ester, prepared by starting with cyclohexyl amine in accordance with the general method set forth in Example 1, are dissolved in 600 cc. of 50 percent ethanol-water. To this solution are added 154 cc. (1.85 mol) of 12 N hydrochloric acid and 101 g. (1.25 mol) of sodium thiocyanate. The reaction mixture is heated for about an hour at 90° C. and then allowed to stand at room temperature for a few hours. The mixture is then cooled in an ice-salt bath, whereupon 1-cyclohexyl-2-mercapto-5-carbomethoxyimidazole precipitates. The precipitate is filtered off, washed with cold water and dried. The yield of 1-cyclohexyl-2-mercapto-5-carbomethoxyimidazole is 178 g. (98 percent of theory).

1 - cyclohexyl - 2 - mercapto - 5 - carbomethoxyimidazole thus prepared melts at 171–172° C. Analysis showed the presence of 11.56 percent nitrogen as compared with the calculated amount of 11.66 percent.

EXAMPLE 6

*Preparation of 1 - benzyl - 2 - mercapto - 5 - carbomethoxyimidazole*

1 - benzyl - 2 - mercapto - 5 - carbomethoxyimidazole represented by the formula

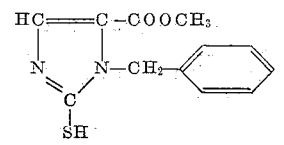

is prepared as follows:

220 g. (0.86 mol) of the sodium enolate salt of N-formyl-N-benzyl-C-formylglycine methyl ester prepared from benzylamine in accordance with the general method set forth in Example 1, are dissolved in 700 cc. of 50 percent ethanol-water. 165 cc. (2 mols) of 12 N hydrochloric acid are added while cooling the solution in an ice-salt mixture, and the cooled solution is treated with 110 g. (1.35 mol) of sodium thiocyanate. The mixture is heated for about an hour at 90° C. and is then allowed to stand at room temperature for a few hours. Upon cooling the mixture in an ice-salt bath, 1-benzyl-2 - mercapto - 5 - carbomethoxyimidazole precipitates. The precipitate is filtered off, washed with cold water and dried. The yield is 206 g. (97 percent of theory).

1 - benzyl - 2 - mercapto - 5 - carbomethoxyimidazole thus prepared melts at about 174–175° C. Analysis disclosed the presence of 58 percent carbon and 4.88 percent hydrogen, as compared with the calculated amounts of 58.04 percent and 4.87 percent respectively.

EXAMPLE 7

*Preparation of 1-α-naphthyl-2-mercapto-5-carbobutoxyimidazole*

1 - α - naphthyl - 2 - mercapto - 5 - carbobutoxyimidazole represented by the formula

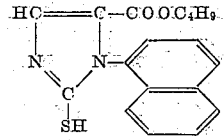

is prepared according to the procedure of Example 1, from sodium thiocyanate and the sodium salt of the C-formyl derivative of N-α-naphthyl-N-formylglycine butyl ester. The substituted glycine butyl ester is obtained in the usual manner, starting with α-naphthylamine. 1-α-naphthyl-2-mercapto-5-carbobutoxyimidazole melts at about 164–166° C.

EXAMPLE 8

*Preparation of 2-mercapto-5-carbohexyloxyimidazole*

2 - mercapto - 5 - carbohexyloxyimidazole represented by the formula

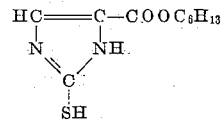

is prepared according to the procedure of Example 1, from sodium thiocyanate and the salt of the C-formyl derivative of the hexyl ester of N-formylglycine. The substituted glycine ester is obtained by formylating glycine hexyl ester in the usual manner. 2-mercapto-5-carbohexyloxyimidazole melts at about 148–151° C.

EXAMPLE 9

*Preparation of 1-p-tolyl-2-mercapto-5-carballyloxyimidazole*

1 - p - tolyl - 2 - mercapto - 5 - carballyloxyimidazole represented by the formula

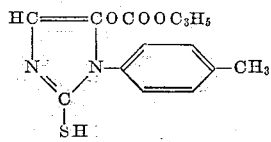

is prepared according to the procedure of Example 1, from sodium thiocyanate and the sodium salt of the C-formyl derivative of N-p-tolyl-N-formylglycine allyl ester. N-p-tolyl-N-formyl-C-formylglycine allyl ester is obtained by reacting p-toluidine and chloroacetic acid to give N-p-tolylglycine, and esterifying and formylating the N - p - tolylglycine. 1 - p - tolyl - 2 - mercapto-5-carballyloxyimidazole melts at about 183–185° C.

EXAMPLE 10

*Preparation of 1 - phenethyl - 2 - mercapto - 5-carbethoxyimidazole*

1 - phenethyl - 2 - mercapto - 5 - carbethoxyimidazole represented by the formula

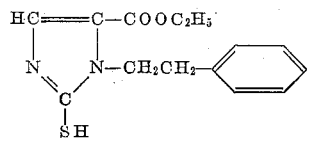

is prepared according to the procedure of Example 1, from sodium thiocyanate and the sodium salt of the C-formyl derivative of N-phenethyl-N-formylglycine ethyl ester. The substituted glycine ethyl ester is obtained by formylating the ethyl ester of N-phenethylglycine. 1-phenethyl-2-mercapto-carbethoxyimidazole melts at about 157–160° C.

EXAMPLE 11

*Preparation of 1-cyclopentyl-2-mercapto-5-carbomethoxyimidazole*

1 - cyclopentyl - 2 - mercapto - 5 - carbomethoxyimidazole represented by the formula

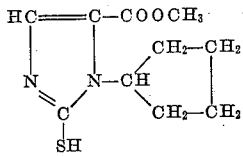

is prepared according to the procedure of Example 2, from thiocyanic acid and the C-formyl derivative of N - cyclohexyl - N - formylglycine methyl ester. The glycine derivative is obtained by reacting cyclopentylamine with formaldehyde and hydrocyanic acid followed by hydrolysis, esterification and formylation in the usual manner. 1 - cyclopentyl - 2 - mercapto - 5 - carbomethoxyimidazole melts at about 167–169° C.

EXAMPLE 12

*Preparation of 1-phenyl - 2 - mercapto - 5 - carbomethoxyimidazole*

1 - phenyl - 2 - mercapto - 5 - carbomethoxyimidazole represented by the formula

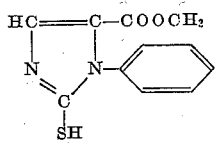

is prepared according to the procedure of Example 1, from sodium thiocyanate and the sodium salt of the C-formyl derivative of N-phenyl-N-acetylglycine methyl ester, the latter compound being obtained by C-formylation of N-phenyl-N-acetylglycine methyl ester. The 1-phenyl-2-mercapto - 5 - carbomethoxyimidazole melts at about 224–225° C. Analysis has shown the presence of 11.96 percent nitrogen as compared with calculated value of 11.95 percent nitrogen.

EXAMPLE 13

*Preparation of 1 - phenyl - 2 - mercapto - 5-carbethoxyimidazole*

1 - phenyl - 2 - mercapto - 5 - carbethoxyimidazole represented by the formula

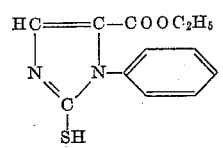

is prepared by a method analogous to that employed in the preparation of the 1-phenyl-2-mercapto-5-carbomethoxyimidazole of Example 12, starting with the C-formyl derivative of N-phenyl-N-acetylglycine ethyl ester. 1-phenyl-2 - mercapto - 5 - carbethoxyimidazole melts at about 188–190° C. Analysis has shown the presence of 11.43 percent nitrogen as compared with calculated value of 11.28 percent nitrogen.

EXAMPLE 14

*Preparation of 1-dodecyl-2-mercapto-5-carbomethoxyimidazole*

1 - dodecyl - 2 - mercapto - 5 - carbomethoxyimidazole represented by the formula

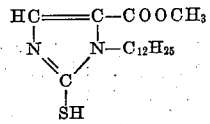

is prepared according to the procedure of Example 1, from sodium thiocyanate and the sodium salt of the C-formyl derivative of N-dodecyl-N-formylglycine methyl ester. The substituted glycine derivative is obtained in the usual manner, starting with dodecyl amine. 1-dodecyl-2-mercapto - 5 - carbomethoxyimidazole melts at about 98–100° C.

I claim:

1. A method of preparing a 2-mercapto-5-carboxyimidazole ester which comprises condensing a C-formylglycine ester enol with a thiocyanate.

2. A method of preparing a 2-mercapto-5-carboxyimidazole ester having the following formula

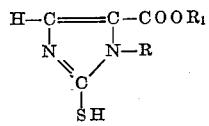

wherein R represents a member of the group consisting of hydrogen, alkyl, cycloalkyl, aryl and alphyl, and $R_1$ represents a lower aliphatic esterifying radical, said method comprising condensing in aqueous solution a thiocyanate with a C-formylglycine ester enol having the following formula

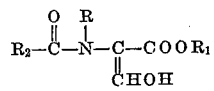

wherein R and $R_1$ have the same significance as before and $R_2$ represents a member of the group consisting of hydrogen, methyl and ethyl.

3. A method according to claim 2 in which the thiocyanate is thiocyanic acid.

4. A method according to claim 2 in which the thiocyanate is a water-soluble metal thiocyanate and the condensation is carried out in the presence of a strong, non-oxidizing mineral acid.

5. A method according to claim 2 in which the thiocyanate is in the form of a water-soluble metal salt and the condensation is carried out in the presence of a strong, non-oxidizing mineral acid.

6. A method of preparing a 2-mercapto-5-carboxyimidazole ester, which comprises condensing in aqueous solution at a temperature between about 20° C. and 100° C. a thiocyanate and a C-formylglycine ester enol represented by the formula

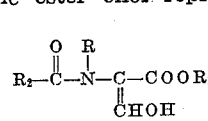

wherein R is a member of the group consisting of hydrogen, alkyl, cycloalkyl, aryl and alphyl, $R_1$ is a lower aliphatic, esterifying radical and $R_2$ is a member of the group consisting of hydrogen, methyl and ethyl.

7. A method of preparing a 2-mercapto-5- carboxyimidazole ester having the following formula

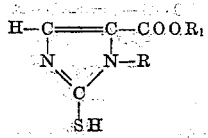

wherein R represents a member of the group consisting of hydrogen, alkyl, cycloalkyl, aryl and alphyl, and R₁ represents a lower aliphatic esterifying radical, said method comprising bringing together in an aqueous solution at a temperature between about 60° C. and 100° C. a thiocyanate and a C-formylglycine ester enol.

REUBEN G. JONES.

REFERENCES CITED

The following references are of record in the file of this patent:

FOREIGN PATENTS

| Number | Country | Date |
|--------|---------|------|
| 258,296 | Germany | Apr. 1, 1913 |

OTHER REFERENCES

Beilstein, 4th ed., vol. 25, page 216 (1935) Both referring to: Gabriel and Posner, Ber. Deut. Chem. Gesell., vol. 27 (1894), pages 1141 ff.

Coghill: Penicillin Report 6, April 21, 1944, CPS #182 (10 pages, especially page 4).